United States Patent
Panosyan et al.

(10) Patent No.: US 8,471,534 B2
(45) Date of Patent: Jun. 25, 2013

(54) FAULT RIDE THROUGH SWITCH FOR POWER GENERATION SYSTEM

(75) Inventors: Ara Panosyan, Munich (DE); Goran Drobnjak, Ismaning (DE); Simon Herbert Schramm, München (DE)

(73) Assignee: General Electric Company, Niskayuna, NY (US)

( * ) Notice: Subject to any disclaimer, the term of this patent is extended or adjusted under 35 U.S.C. 154(b) by 488 days.

(21) Appl. No.: 12/868,788

(22) Filed: Aug. 26, 2010

(65) Prior Publication Data

US 2012/0049805 A1 Mar. 1, 2012

(51) Int. Cl.
*H02J 1/00* (2006.01)
*H02J 3/00* (2006.01)
*H02P 9/00* (2006.01)

(52) U.S. Cl.
USPC ................................ 322/7; 322/44

(58) Field of Classification Search
USPC ......... 322/21, 44, 59, 89; 290/44, 55; 361/17; 307/105; 324/500, 522; 700/290
See application file for complete search history.

(56) References Cited

U.S. PATENT DOCUMENTS

| | | | |
|---|---|---|---|
| 4,704,571 A * | 11/1987 | Rosenberg | 322/29 |
| 6,921,985 B2 | 7/2005 | Janssen et al. | |
| 7,256,508 B2 * | 8/2007 | Altemark et al. | 290/44 |
| 7,285,873 B2 * | 10/2007 | Brault | 307/19 |
| 7,944,068 B2 * | 5/2011 | Wagoner et al. | 290/44 |
| 2005/0116476 A1 * | 6/2005 | Feddersen | 290/44 |
| 2006/0192390 A1 * | 8/2006 | Juanarena Saragueta et al. | 290/44 |
| 2009/0058086 A1 | 3/2009 | Arinaga et al. | |
| 2009/0174187 A1 | 7/2009 | Nyborg | |
| 2010/0118568 A1 * | 5/2010 | Helle et al. | 363/34 |
| 2010/0231040 A1 * | 9/2010 | Schweitzer, III | 307/24 |

* cited by examiner

*Primary Examiner* — Julio Gonzalez
(74) *Attorney, Agent, or Firm* — Ann M. Agosti

(57) ABSTRACT

A power generation system that includes a prime mover configured to generate mechanical energy. The power generation system also includes a power generator configured for generating electrical power from the mechanical energy received from the prime mover. The power generation system further includes a fault ride-through switch electrically coupled in series between the power generator and a power grid. The fault ride-through switch includes a first branch configured to carry the electrical power during normal operating conditions and includes an LC resonance circuit. The fault ride-through switch also includes a multiphase transformer configured for providing voltage phases of different polarities to the LC resonance circuit. The fault ride-through switch further includes a second branch coupled in parallel with the first branch and including a resistive element and an inductive element electrically coupled in series wherein the resistive element configured to absorb the electrical power during fault conditions.

19 Claims, 4 Drawing Sheets

FAULT RIDE THROUGH SWITCH FOR POWER GENERATION SYSTEM

BACKGROUND

The invention relates generally to a power generation system and more particularly to a fault ride through switch and method of use in a power generation system.

Power generation systems typically include power generators that generate power from various sources and transfer the generated power to a power grid connected to the power generators. The power grid collects the power generated from multiple power generators and transmits the power to different locations. Generally, in order to connect any power generator to the power grid, the power generator must comply with grid code requirements of that particular location. One such grid code requirement is a fault ride through operation of the power generator for the entire duration of the grid event.

Several kinds of faults may occur during operation of the power generation system such as "voltage dip," "voltage sag," or a short circuit at a point of interconnection with the power grid. In an event of a fault, certain types of power generators accelerate rapidly, loose synchronism during operation, and, consequently, fail the grid code "ride through" requirement. In a non-limiting example, certain types of generators include small rotor generators. These kinds of power generators are often not allowed to connect to the power grid as they tend to be non compliant with the grid codes.

Various approaches are employed to overcome the issue of rapid acceleration in power generators during fault conditions. One such mechanical approach is to provide a braking mechanism to halt a prime mover in the power generator. This approach results in power generation losses, inefficiency, and high maintenance costs. Another approach provides an electrical brake concept to halt the power generators during fault conditions. However, most of the electrical brake concepts include expensive power electronics.

Hence, there is a need for an improved system and method for an inexpensive fault ride through power generation system to address one or more aforementioned issues.

BRIEF DESCRIPTION

In an embodiment of the invention, a power generation system is provided. The power generation system includes a prime mover configured to generate mechanical energy. The power generation system also includes a power generator configured for generating electrical power from the mechanical energy received from the prime mover. The power generation system further includes a fault ride-through switch electrically coupled in series between the power generator and a power grid. The fault ride-through switch includes a first branch configured to carry the electrical power during normal operating conditions and includes an LC resonance circuit at each phase of the power generation system. The fault ride-through switch also includes one or more multiphase transformers configured for providing voltage phases of different polarities to the LC resonance circuit at each phase of the power generation system. The fault ride-through switch further includes a second branch coupled in parallel with the first branch and including a resistive element and an inductive element electrically coupled in series at each phase of the power generation system wherein the resistive element is configured to absorb the electrical power during fault conditions.

In another embodiment of the invention, a fault ride-through switch electrically configured for being coupled in series between a power generator of a power generation system and a power grid is provided. The fault ride-through switch includes a first branch configured to carry electrical power from the power generator during normal operating conditions and includes an LC resonance circuit at each phase of the power generation system. The fault ride-through switch also includes one or more multiphase transformers configured for providing voltage phases of different polarities to the LC resonance circuit at each phase of the power generation system. The fault ride-through switch further includes a second branch coupled in parallel with the first branch and including a resistive element and an inductive element electrically coupled in series at each phase of the power generation system wherein the resistive element is configured to absorb the electrical power during fault conditions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a fault-ride through switch and a power generation system including a fault ride-through switch. The power generation system includes a prime mover configured to generate mechanical energy from various sources. The prime mover transfers the mechanical energy to a power generator configured to convert the mechanical energy to electrical power. The electrical power is transmitted to a power grid. A fault ride-through switch is coupled between the power generator and the power grid and includes a first branch and a second branch each having the same number of legs as the power generation system phases (herein after referenced as "system phases"). The first branch further includes a LC resonance circuit at each leg of the first branch. The first branch also includes one or more multiphase transformers at each leg electrically coupled in series to the LC resonance circuit.

The power from the power generator flows from the first branch during normal operating conditions. In an event of fault, the power from the power generator is diverted from the first branch and flows through a second branch. The second branch includes an inductive element as well as a resistive element that absorbs the power received from the power generator during the fault conditions. This absorption enables synchronized operation of the prime mover and power generator during fault conditions. As used herein, the terms "a" and "an" do not denote a limitation of quantity, but rather denote the presence of at least one of the referenced item. The fault ride-through power generation system is described below in detail with reference to FIG. 1 to FIG. 7.

Figure 1:
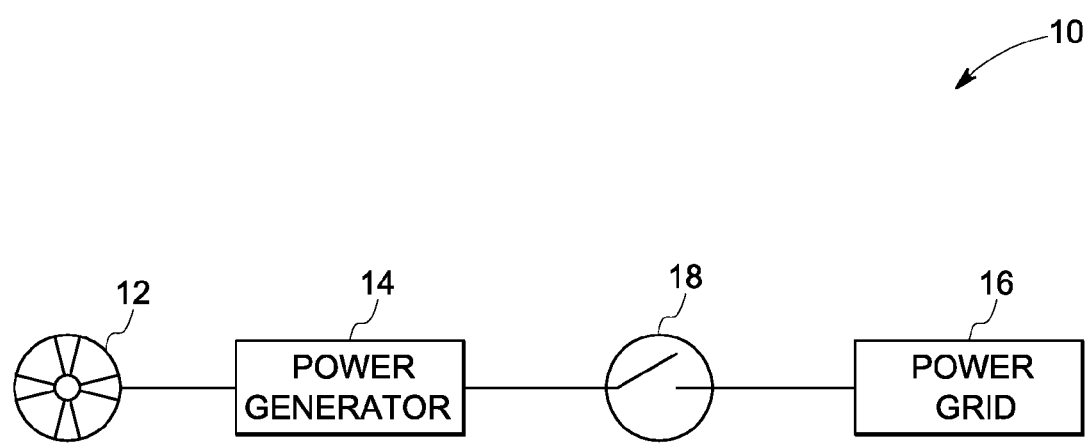
FIG. 1 is a schematic representation of a power generation system in accordance with an embodiment of the invention.

FIG. 1 is a schematic representation of a power generation system 10 in accordance with an embodiment of the invention. Power generation system 10 includes a prime mover 12 configured to generate mechanical energy. Prime mover 12 typically includes a rotor (not shown) such as a wind turbine, a gas turbine, or a diesel generator rotor. Prime mover 12 is mechanically coupled to a power generator 14 configured to generate electrical power from the mechanical energy received from prime mover 12. In one embodiment, power generator 14 includes a three-phase power generator. The electrical power is transmitted to a power grid 16 through a fault ride through switch 18 electrically coupled in series between power generator 14 and power grid 16.

Figure 2:
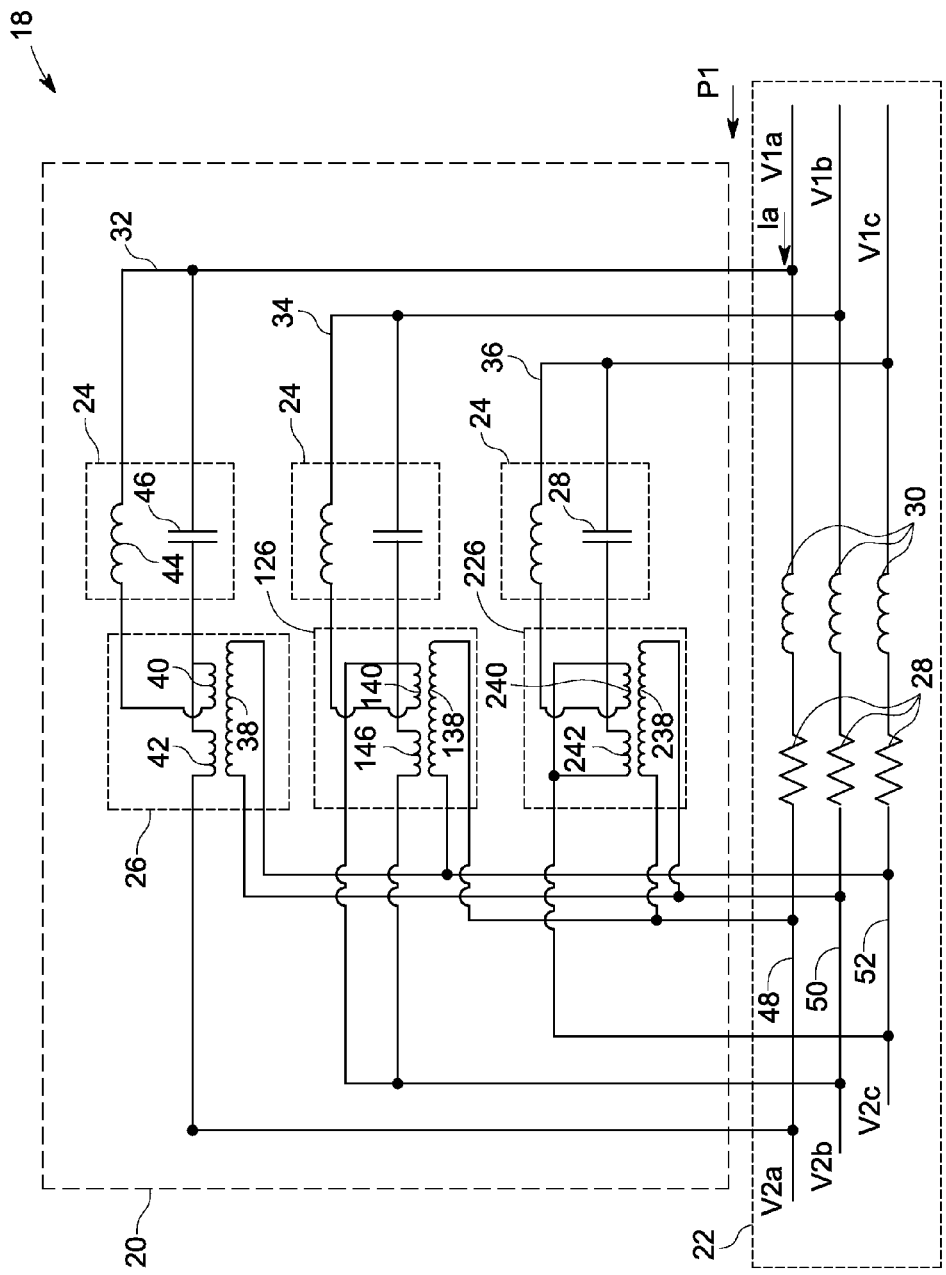
FIG. 2 is a schematic representation of a fault ride-through switch shown in accordance with an embodiment of the invention.

As shown in FIG. 2, fault ride through switch 18 includes a first branch 20 and a second branch 22. First branch 20 includes, for each phase of power generation system 10, an LC resonance circuit 24 and a respective multiphase transformer 26, 126, 226 configured for providing voltage phases of different polarities to the LC resonance circuit 24. Second branch 22 is electrically coupled with the first branch 20 in parallel and includes a resistive element 28 and an inductive element 30 for each phase of power generation system 10. Resistive element 28 is electrically coupled to the inductive element 30 in series and absorbs the electrical power during fault conditions. In operation, during normal operating conditions, the electrical power P1 received from power generator 14 (FIG. 1) flows through the first branch 20 of fault ride through switch 18, and, during fault conditions, most of the electrical power flows through the second branch 22 of fault ride through switch 18.

In the example shown in FIG. 2, first branch 20 of fault ride through switch 18 includes three branch legs 32, 34, and 36 for system phases "a", "b" and "c" respectively, and second branch 22 includes three branch legs 48, 50, and 52 for system phases "a", "b" and "c" respectively. Fault ride through switch 18 receives an input electrical power P1 in three phases $P1_a$, $P1_b$, and $P1_c$ from power generator 14. Input electrical power $P1_a$, $P1_b$, and $P1_c$ includes voltages $V1_a$, $V1_b$, and $V1_c$ and currents $I_a$, $I_b$, and $I_c$ respectively. Each of the branch legs 32, 34 and 36 includes an LC resonance circuit 24 and a respective multiphase transformer 26, 126, 226. The input electrical power $P1_a$, $P1_b$, and $P1_c$ flows through the three branch legs of branch 20 simultaneously during normal operating conditions.

For ease of illustration, flow of the input electrical power $P1_a$ through branch leg 32 will be described in detail. During normal operating conditions the input electrical power $P1_a$ includes voltage $V1_a$ and current $I_a$. The current $I_a$ flows through the branch leg 32. LC resonance circuit 24 of branch leg 32 has a resonance frequency substantially equal to that of power generation system 10. The LC resonance circuit 24 does not behave as a resonant circuit during the normal operating conditions. The non-resonant behavior of LC resonance 24 circuit occurs when LC resonance circuit 24 is subject to voltages that are almost equal in amplitude but are of different polarities. Such voltages are generated by multiphase transformers 26 coupled in series with LC resonance circuit 24. Multiphase transformers 26 are configured for providing voltage phases of different polarities to the LC resonance circuit 24 at each phase of the power generation system 10. In the embodiment shown in FIG. 2, transformers 26, 126, 226 each include a three phase transformer comprising three windings (38, 40, 42 for branch leg 32; 138, 140, 142 for branch leg 34; 238, 240, 242 for branch leg 36). Alternatively, the multiphase transformer at each phase may comprise two winding transformers. Although the transformers are shown as being situated between the LC resonance circuits 24 and the switch output, in practice the transformers may be situated on either side of the LC resonance circuits 24.

Multiphase transformer 26 at branch leg 32 includes a primary winding 38, a secondary winding 40, and a tertiary winding 42. In the embodiment of FIG. 2, secondary winding 40 and tertiary winding 42 are electrically coupled to LC resonance circuit 24 at phase "a" with the secondary winding 40 being coupled to an inductor 44 in LC resonance circuit 24 and the tertiary winding 42 being coupled to a capacitor 46 in LC resonance circuit 24. The secondary winding 40 and the tertiary winding 42 provide voltage phases of different polarities to the LC resonance circuit 24.

In the embodiment of FIG. 2, the primary winding 38 is electrically coupled to the remaining two phases ("b" and "c") at respective ends of the primary winding 38. The primary winding in FIG. 2 is split across the secondary and tertiary windings and has a center connection that is coupled across primary winding 138 of phase "b" branch 34 of the first branch 20 and extends to phase "c" of the second branch. Similarly, the branch leg 34 includes a multiphase transformer 126 including a primary winding 138 coupled to phase "a" and phase "c" at respective ends and a secondary winding 140 and a tertiary winding 142 coupled to phase "b". Branch leg 34 has a center connection of primary winding 138 that is coupled across branch leg 36 (phase "c") of first branch 20 and extends to branch leg 50 (phase "b" of second branch 22. The third branch leg 36 includes a multiphase transformer 226 that includes a primary winding 238, a secondary winding 240 and a tertiary winding 242 coupled in a similar way as described above. In an exemplary embodiment, the ratios of the primary winding 38 to the secondary winding 40 and the primary winding 38 to the tertiary winding 42 are identical. The identical ratios provide the voltages at same amplitude to the LC resonance circuit 24. Therefore, the resonance circuit 24 receives voltages which are almost equal in amplitude with different polarities and result in the non-resonant state of the LC resonant circuit 24 during normal operating conditions.

The LC resonance circuit 24 at the branch leg 32 includes an inductor current $I_l$ and a capacitor current $I_c$. The voltages are applied to the LC resonance circuit 24 at such a phase that the inductor current $I_l$ and the capacitor current $I_c$ combine to form the phase branch current $I_a$ in phase with $V1_a$ and an output voltage $V2_a$ received at an output of the branch leg 32 in the fault ride through switch 18 during operating conditions.

During fault conditions, in contrast, at zero or low voltage at the output the voltages across the inductor 44 and the capacitor 46 of the LC resonance circuit 24 become almost in phase at about the same amplitude, and high impedance or an infinite impedance or resonance state results in LC resonance circuit 24. Under this in phase state, branch leg 32 current $I_a$ is unable to flow from the first branch 20, and thus the flow of the input electrical power $P1_a$ is diverted to branch leg 48 of second branch 22. In one embodiment, each leg of branch 22 includes a respective resistive element 28 and a respective inductive element 30 electrically coupled in series to each other. The resistive element 28 absorbs the input electrical power $P1_a$ received from power generator 14 during the fault conditions. The inductive element 30 provides a delay in the voltage drop thereby enabling the resistive element 28 to absorb the input electrical power $P1_a$ steadily and uniformly over a period of time. The resistive element 28 is selected based on the magnitude of power and voltage to be handled by the power generation system.

The absorption of the input electrical power $P1_a$ received from the power generator 14 during fault conditions results in synchronized operations of power generator 14 and prime mover 12. Once the fault is rectified and input voltages V1a, V1b and V1c are normal, the state of LC resonance circuit 24 is changed to the non-resonant state, thus allowing the input electrical power $P1_a$ to flow from the first branch 20 as described above.

The flow of the input electrical power $P1_b$ and $P1_c$ in branch leg 34 and 36 occurs in a similar manner as described above with reference to the flow of the input electrical power $P1_a$ in branch leg 32. The operation of the fault ride through switch 18 may be better understood with reference to FIG. 3 below.

Figure 3:
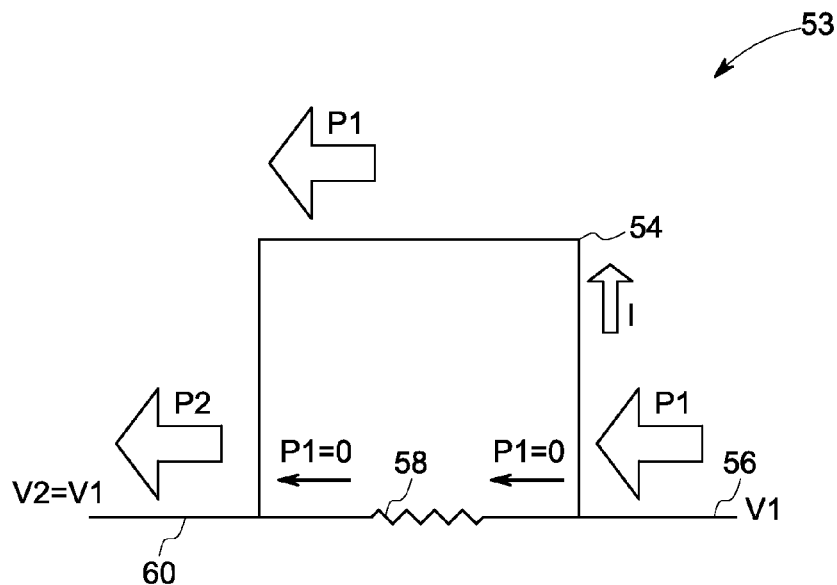
FIG. 3 is a diagrammatic illustration of the fault ride-through switch of FIG. 2 operating in pre-fault and post-fault conditions in accordance with an embodiment of the invention.

FIG. 3 is a diagrammatic illustration 53 of the fault ride-through switch 18 of FIG. 2 operating in pre-fault and post-fault conditions in accordance with an embodiment of the invention. For simplicity, consider the three branch legs 32, 34 and 36 in first branch 20 as an integrated first branch 54 and the three branch legs 48, 50 and 52 in second branch 22 as an integrated second branch 56. It is well known that the current flows from a least resistive path in an electrical circuit. In the instant case, during the pre fault and the post fault conditions, integrated first branch 54 provides nearly zero resistance compared to a resistance provided by an integrated resistive element 58 of integrated second branch 56. Therefore, a current I in the input electrical power P1 flows through the integrated first branch 54 and is received at an output 60 of the fault ride through switch 18 with the same magnitude. Furthermore, nearly zero resistance in the integrated first branch 54 results in an output power P2 substantially equal to that of the input electrical power P1 and an output voltage V2 substantially equal to that of the input voltage V1. Additionally, little to no current and no power P1 flows through the integrated second branch 56 in pre and post fault conditions. The voltage and current characteristics of the electrical power flowing within the fault ride through switch 18 are described in greater detail with respect to FIG. 4 below.

Figure 4:
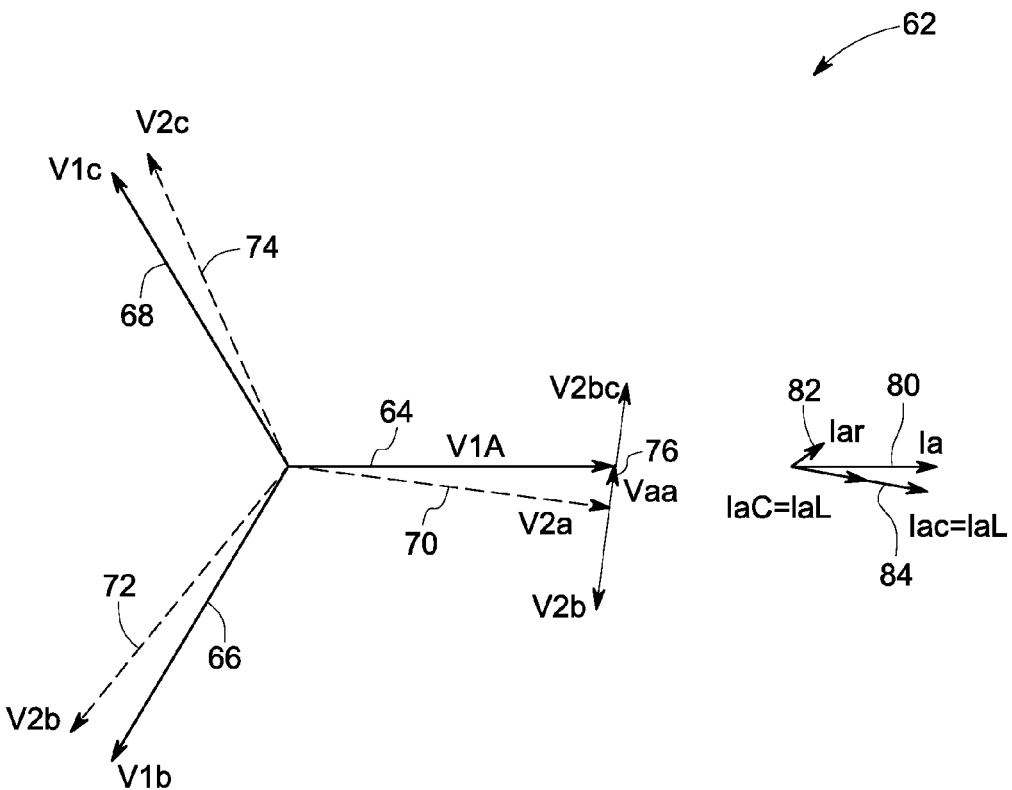
FIG. 4 is a phasor diagram depicting a voltage and a current in different phases of the fault ride-through switch of FIG. 3 operating in pre-fault and post-fault conditions in accordance with an embodiment of the invention.

FIG. 4 is a phasor diagram 62 depicting a voltage and a current in different phases of the fault ride-through switch 18 of FIG. 3 operating in pre-fault and post-fault conditions in accordance with an embodiment of the invention. As illustrated below, the phasor diagram 62 includes input voltage vectors in three phases $V1_a$, $V1_b$ and $V1_c$ depicted by 64, 66 and 68 and output voltage vectors in the respective three phases $V2_a$, $V2_b$ and $V2_c$ depicted by 70, 72 and 74. A difference between the output voltages $V2_b$ and $V2_c$ on the secondary winding of the multiphase transformer is depicted as $V2_{bc}$. A difference between the output voltage $V2_c$ and $V2_b$ on the tertiary winding of the multiphase transformer is provided as $V2_{cb}$. A difference between the input voltage $V1_a$ and the output voltage $V2_a$ at phase "a" is shown by a vector $V_{aa}$ depicted by 76.

The current I in the fault ride through switch 18 is illustrated below as current vector $I_a$ of the current in phase "a" depicted by 80, a current $I_{ar}$ through the integrated resistive element 58 in the integrated second branch 56 under normal operating conditions is represented by a current vector depicted by 82 and the current $I_{ac}$ and $I_{al}$ through the inductor 44 and the capacitor 46 provided in the first branch 20 at each phase is depicted by 84.

As illustrated by the phasor diagram, the voltages $V2_{bc}$ and $V2_{cb}$ are added in series to the voltage $V1_a$ in the LC resonance circuit 24 resulting in currents $I_{al}$ and $I_{ac}$ at the inductor 44 and the capacitor 46 of the LC resonance circuit 24 respectively. The inductor current $I_{al}$ and the capacitor current $I_{ac}$ are almost in phase and almost equal in amplitude when the voltage difference $V_{aa}$ between the input voltage $V1_a$ and output voltage $V2_a$ is zero. For example, at one instant, $V1_a$ is substantially equal to $V2_b$. In such cases the flow of power P1 results in a small phase shift between the input voltage of one phase $V1_a$ and the output voltage of another phase $V2_b$. However, the phase shift between $V1_a$ and $V2_b$ is negligible, leading to in phase inductor current $I_{al}$ and the capacitor current $I_{ac}$ with almost equal magnitudes. Furthermore, the current $I_{ar}$ through the integrated resistive element 58 in the integrated second branch 56 is close to zero as the difference $V_{aa}$ between $V1_a$ and $V2_b$ is close to zero.

Figure 5:
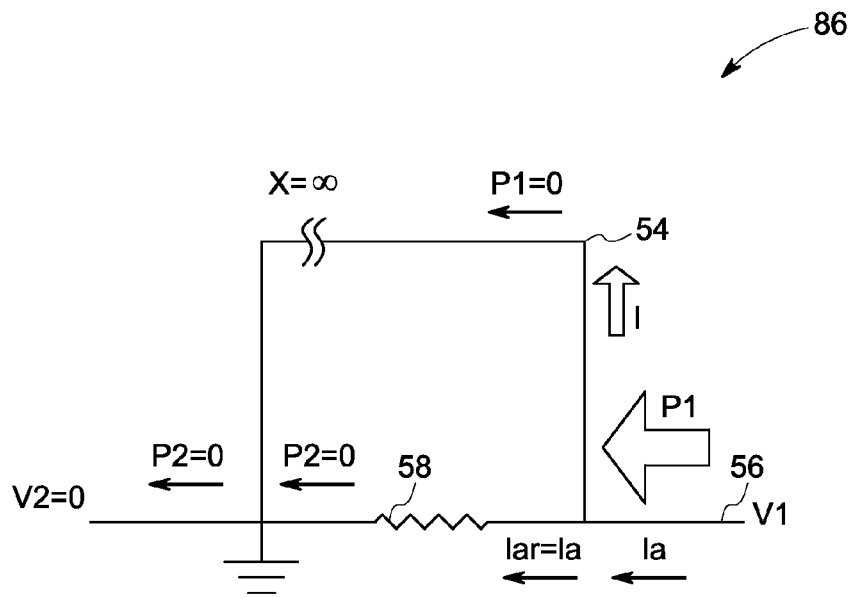
FIG. 5 is a diagrammatic illustration of the fault ride-through switch of FIG. 3 operating in a fault condition in accordance with an embodiment of the invention.

FIG. 5 is a diagrammatic illustration 86 of the fault ride-through switch 18 of FIG. 3 operating in a fault condition in accordance with an embodiment of the invention. In the instant case, during the fault conditions the LC resonance circuit 24 provides an almost infinite resistance within the integrated first branch 54 compared to a resistance provided by integrated resistive element 58 of integrated second branch 56. Therefore, the current I in the input electrical power P1 flows through integrated second branch 56 and nearly zero current flows through the integrated first branch 54. Integrated resistive element 58 in integrated second branch 56 absorbs the current I flowing through integrated second branch 56. The absorbing of the input current I during fault conditions results in maintaining the synchronism of the power generation system 14 and the prime mover 12. The voltage and current characteristics of the input electrical power P1 flowing within the fault ride through switch 18 during fault conditions are described in greater detail with respect to FIG. 6 below.

Figure 6:
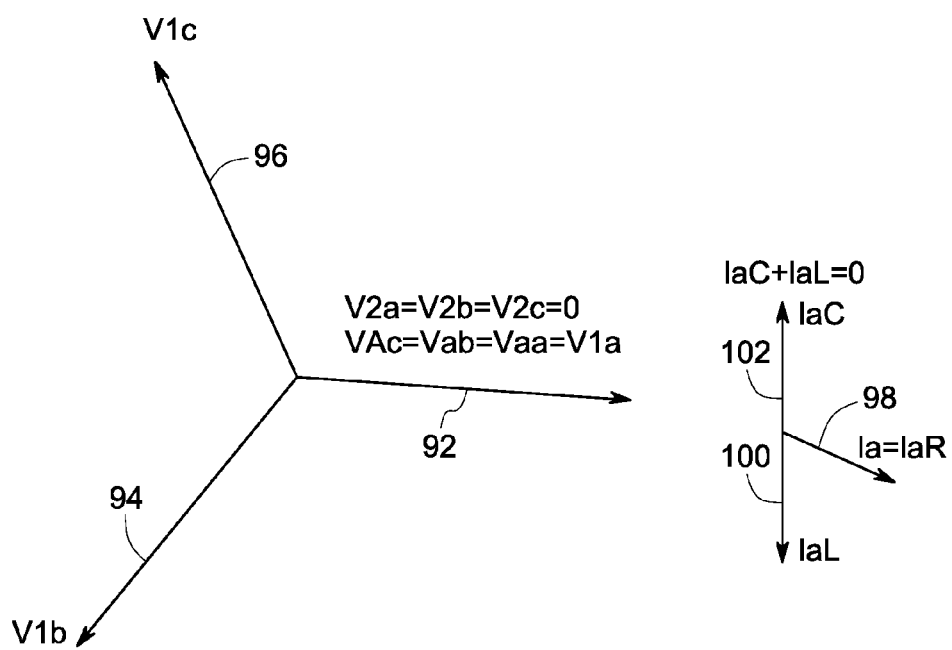
FIG. 6 is a phasor diagram depicting a voltage and a current in different phases of the fault ride-through switch of FIG. 5 operating in a three phase zero impedance fault condition in accordance with an embodiment of the invention.

FIG. 6 is a phasor diagram 90 depicting a voltage and a current in different phases of the fault ride-through switch 18 of FIG. 5 operating in a three phase zero impedance fault condition in accordance with an embodiment of the invention. As illustrated below, the phasor diagram 90 includes input voltage vectors in three phases $V1_a$, $V1_b$ and $V1_c$ depicted by 92, 94 and 96 and output voltage vectors in the respective three phases $V2_a$, $V2_b$ and $V2_c$ are zero. A phase difference between the input voltage $V1_a$ and the output voltage $V2_b$ at phase "b" shown by a vector $V_{ab}$, a phase difference between the input voltage $V1_a$ and the output voltage $V2_c$ at phase "c" shown by a vector $V_{ac}$ and a phase difference between the input voltage $V1_a$ and the output voltage $V2_a$ at phase "a" shown by a vector $V_{aa}$.

The current I in fault ride through switch 18 is illustrated below as current vector $I_a$ of the current in phase "a". current $I_{ar}$ through the integrated resistive element 58 (FIG. 5) in the integrated second branch 56 under normal operating conditions is represented by a current vector depicted by 98. The current $I_{al}$ through the inductor 44 (FIG. 2) at each phase is depicted by 100. The current $I_{ac}$ through the capacitor 46 provided in the first branch 20 (FIG. 2) at each phase is depicted by 102.

As illustrated herein, the fault condition results in a zero impedance three-phase short circuit at the output 60. The particular fault condition results in zero output voltages at each phase (V2a=V2b=V2c=0). However, the input voltages $V1_a$, $V1_b$ and $V1_c$ are supplied to the fault ride through switch by the power generator. The zero output voltage $V2_a$=0 results in $V_{aa}$ being equal to $V1_a$. Furthermore, the inductor current $I_{al}$ and the capacitor current $I_{ac}$ become 180 degrees phase shifted to each other having equal amplitude resulting in zero current at the output. Therefore, the current flows through the integrated second branch via the inductive element and the resistive element.

The various embodiments of the fault ride through switch and method for power generation described above includes a prime mover, a power generator, a fault ride through switch and a power grid. Thus, these tools and techniques enable the power generation system to operate in a faulty condition and to maintain synchronism between the prime mover and the power generator during faults. The fault ride through switch also enables the power generators to fulfill the grid code requirements of a "fault ride through" thereby allowing vendors to attach their power generators to the power grid. The fault ride through operation of the power generation system provides an increased efficiency at a lower cost.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a three-phase transformer with respect to one embodiment can be adapted for use with two windings described with respect to another embodiment of the invention to provide a fault ride through operation. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
    a prime mover configured to generate mechanical energy;
    a power generator configured for generating electrical power from the mechanical energy received from the prime mover; and
    a fault ride-through switch electrically coupled in series between the power generator and a power grid, the fault-ride through switch comprising:
        a first branch configured to carry the electrical power during normal operating conditions and comprising an LC resonance circuit at each phase of the power generation system;
        a multiphase transformer configured for providing voltage phases of different polarities to the LC resonance circuit at each phase of the power generation system; and
        a second branch coupled in parallel with the first branch and comprising a resistive element and an inductive element electrically coupled in series at each phase of the power generation system, wherein the resistive element is configured to absorb the electrical power during fault conditions.

2. The power generation system of claim 1, wherein the LC resonance circuit comprises a resonance frequency substantially equal to that of the power generation system frequency.

3. The power generation system of claim 1, wherein the power generator comprises a three-phase power generator.

4. The power generation system of claim 1, wherein the multiphase transformer comprises a three-phase transformer.

5. The power generation system of claim 4, wherein the multiphase transformer comprises three winding transformer.

6. The power generation system of claim 5, wherein the three windings comprises a primary winding, a secondary winding, and a tertiary winding.

7. The power generation system of claim 6, wherein ratios of the primary winding to the secondary winding and the primary winding to the tertiary winding are identical.

8. The power generation system of claim 6, wherein the secondary winding and the tertiary winding are electrically coupled to the LC resonance circuit in series at each phase.

9. The power generation system of claim 8, wherein the secondary winding is coupled to one component of the LC resonance circuit and the tertiary winding is coupled to another component of the LC resonance circuit.

10. A fault ride-through switch electrically configured for being coupled in series between a power generator of a power generation system and a power grid, the fault-ride through switch comprising:
    a first branch configured to carry electrical power during normal operating conditions and comprising an LC resonance circuit at each phase of the power generation system;
    a multi-phase transformer configured for providing voltage phases of different polarities to the LC resonance circuit at each phase of the power generation system; and
    a second branch coupled in parallel with the first branch and comprising a resistive element and an inductive element electrically coupled in series at each phase of the power generation system, wherein the resistive element is configured to absorb the electrical power during fault conditions.

11. The fault ride-through switch of claim 10, wherein the LC circuit comprises a resonance frequency substantially equal to that of the power generation system frequency.

12. The fault ride-through switch of claim 10, wherein the multiphase transformer comprises a three-phase transformer.

13. The fault ride-through switch of claim 10, wherein the multiphase transformer comprises a three winding transformer.

14. The fault ride-through switch of claim 13, wherein the three winding transformer comprises a primary winding, a secondary winding, and a tertiary winding.

15. The fault ride-through switch of claim 14, wherein ratios of the primary winding to the secondary winding and the primary winding to the tertiary winding are identical.

16. The fault ride-through switch of claim 14, wherein the secondary winding and the tertiary winding are electrically coupled to the LC resonant circuit in series at each phase.

17. The fault ride-through switch of claim 16, wherein the secondary winding and the tertiary winding provide the voltage phases at different polarities to the LC resonant circuit in series at each phase.

18. The fault ride-through switch of claim 16, wherein the secondary winding and the tertiary winding are electrically coupled to an inductor and a capacitor in the LC resonance circuit at each phase respectively.

19. The fault ride-through switch of claim 14, wherein the primary winding is electrically coupled to remaining two phases at respective ends of the primary winding at each phase wherein the two phases comprise phases not coupled to the secondary winding and the tertiary winding at each phase.

* * * * *

UNITED STATES PATENT AND TRADEMARK OFFICE
CERTIFICATE OF CORRECTION

| | | |
|---|---|---|
| PATENT NO. | : 8,471,534 B2 | Page 1 of 1 |
| APPLICATION NO. | : 12/868788 | |
| DATED | : June 25, 2013 | |
| INVENTOR(S) | : Panosyan et al. | |

It is certified that error appears in the above-identified patent and that said Letters Patent is hereby corrected as shown below:

On the Title Page, in the Figure, delete Tag "146" and insert Tag -- 142 --, therefor.

On the Title Page, in the Figure, delete Tag "28" from the lowest block 24 and insert Tag -- 46 --, therefor.

In the Drawings

In Fig. 2, Sheet 2 of 4, delete Tag "146" and insert Tag -- 142 --, therefor.

In Fig. 2, Sheet 2 of 4, delete Tag "28" from the lowest block 24 and insert Tag -- 46 --, therefor.

Signed and Sealed this
Sixth Day of May, 2014

Michelle K. Lee
*Deputy Director of the United States Patent and Trademark Office*